UNITED STATES PATENT OFFICE.

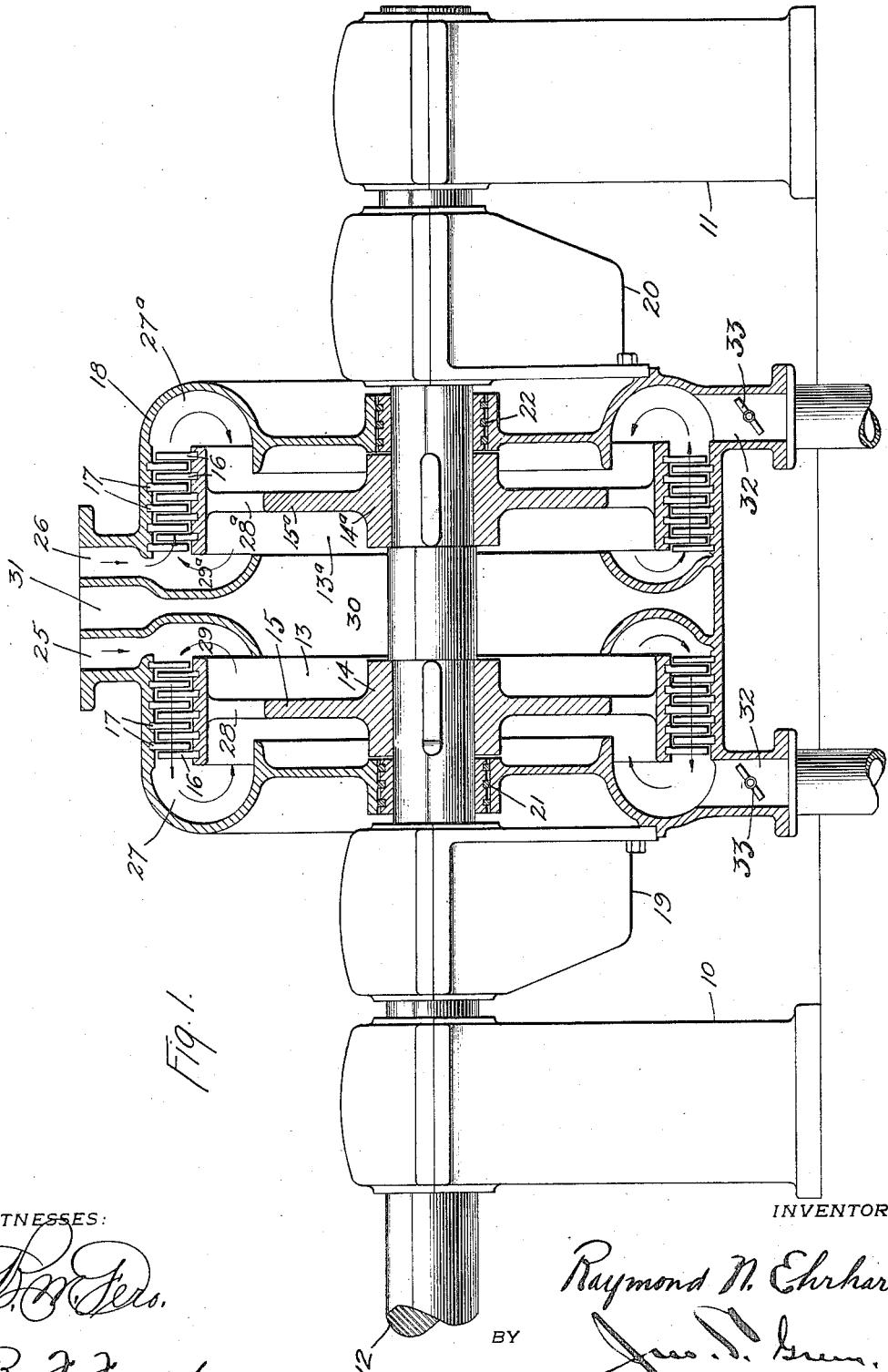

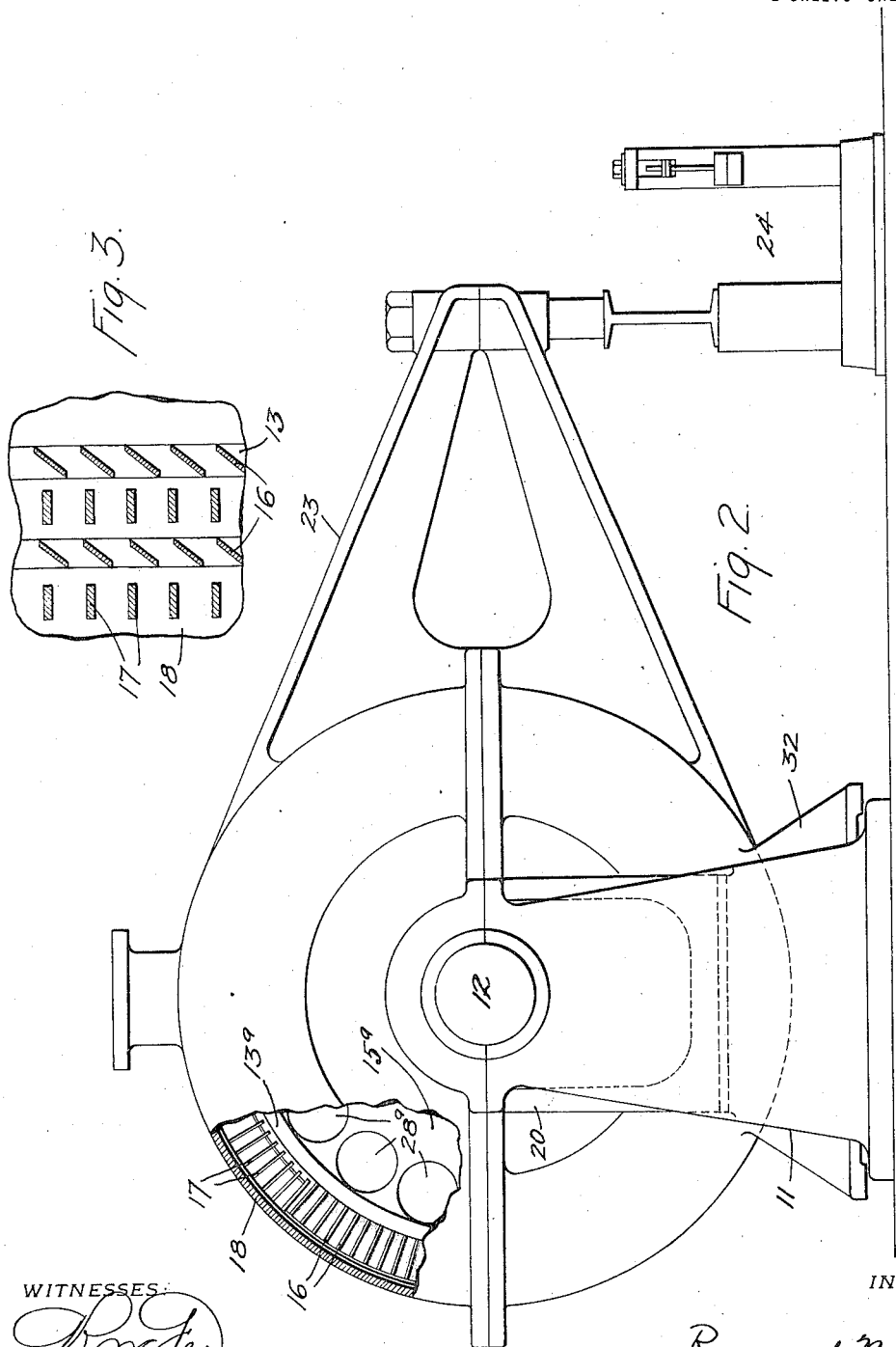

RAYMOND N. EHRHART, OF EDGEWOOD PARK, PENNSYLVANIA, ASSIGNOR, BY MESNE ASSIGNMENTS, TO THE COLONIAL TRUST COMPANY, TRUSTEE, OF PITTSBURGH, PENNSYLVANIA, A CORPORATION OF PENNSYLVANIA.

REVERSIBLE WATER-BRAKE.

1,161,117.  Specification of Letters Patent.  Patented Nov. 23, 1915.

Application filed October 1, 1910. Serial No. 584,849.

*To all whom it may concern:*

Be it known that I, RAYMOND N. EHRHART, a citizen of the United States, and a resident of Edgewood Park, in the county of Allegheny and State of Pennsylvania, have made a new and useful Invention in Reversible Water-Brakes, of which the following is a specification.

This invention relates to fluid brakes to be used in determining the developed horse power or torque of a motor or shaft.

One of the objects of the invention is to provide a hydraulic absorption dynamometer, which may be utilized in connection with a motor or shaft for the purpose of determining the power delivered.

Another object of the invention is to provide means for using the liquid repeatedly and for maintaining an approximately constant amount of liquid within the casing.

Another object of the invention is to provide an absorption dynamometer, which may be effectually rotated in either direction with the same efficiency.

With the above and other objects in view, the invention consists in certain parts and combinations of parts, all of which will be described hereinafter; it being understood that changes in form, proportion and minor details of construction may be resorted to without departing from the spirit of the invention or sacrificing any of the advantages thereof.

In the drawings: Figure 1 illustrates a longitudinal sectional view through a dynamometer and brake constructed in accordance with my invention; Fig. 2 is an end view of the invention coupled up to a scale and parts of the casing being broken away to illustrate the interior construction of the brake; and Fig. 3 is a diagrammatical view of a portion of the rotor showing the blades thereof, together with the relative position of the blades or vanes, which are attached to the casing or stator.

The invention is illustrated as comprising two main elements, the stator and the rotor. The stator is provided with inlet ports, which admit water into the stator or casing, so that the liquid may resist the movement of certain blades on the rotor and thus resist its movement. The liquid introduced into the stator or casing may be caused to repass the blades until it is finally regenerated into steam or vapor and passed off through a suitable orifice or orifices. The stator is adapted to have a slight rotative movement on its bearings so that an arm projecting therefrom may exert pressure or weight upon a suitable scale, whereby the resistance which the casing must offer to prevent its being rotated, may be measured by the pressure exerted on the scale. From this pressure, the effective length of the arm and the number of revolutions per minute the power is calculated in identically the same manner as in the case of the ordinary Prony or band brake.

Referring now to the drawings by numerals of reference, 10 and 11 designate pedestals for the shaft 12. The shaft 12 may be connected direct to the motor, or it may be connected to the reduction gear, or any other change speed gear. The present case illustrates the shaft 12 as carrying the rotor of the dynamometer or brake. The rotor is illustrated as consisting of two drums 13 and 13$^a$, having hubs 14 and 14$^a$ keyed or otherwise secured to the shaft 12. The hubs are connected to their drums by webs 15 and 15$^a$ and carry rows of blades mounted on their peripheries, said blades 16 alternating with blades 17 carried by the stator 18. The stator or casing is mounted on the pedestals 19 and 20 carried on the shaft 12 and the ends of the casing are provided with suitable packings 21 and 22. Projecting from the exterior of the casing 18 is an arm 23, which, through any suitable means, may exert pressure against the platform of the scale 24. The stator and rotor are provided with alternate rows of blades or vanes; but for the sake of clearness, those on the rotor will be designated as blades and those on the stator as vanes.

By reference to Fig. 3, it will be observed that the stator is provided with relatively wide flat vanes, which have faces approximately parallel to the axis of the drum, which carries them; while the vanes carried by the drums or rotors are at angles to the axis of the rotor on which they are mounted. The casing or stator 18 is here shown as being provided with inlet ports 25 and 26 connected to a suitable source of water supply, so that water may enter and pass in the direction of the arrows through the blades into reëntrant nozzles 27 and 27ª through openings 28 and 28ª in the webs 15 and 15ª and through the reëntrant nozzles 29 and 29ª back through the blades, so that the water entering through the ports 25 and 26 will be propelled past and repass the blades repeatedly. The absorption of energy by the liquid will generate steam which will be collected in a steam chamber 30 located within the stator and communicating with a steam exhaust port 31 formed in the stator. The stator is also provided with exhaust ports 32, one for each end of the stator or casing and these ports may be provided with suitable valves designated 33.

Assuming that all the parts are assembled and motion is imparted to the shaft 12, liquid may be permitted to enter through the ports 25 and 26, thence through the annular space occupied by the blades and vanes, through the nozzles 27 and 27ª, through the openings in the webs 15 and 15ª and back through the blades and vanes.

The action of the blades is to propel the water axially and at the same time to impart angular or whirling motion to it so that the water is projected against the stationary vanes 17 as it issues from each row of blades. The working faces of the vanes 17 are flat and are axially disposed so that they check or prevent the angular or whirling motion of the water and dissipate or absorb the kinetic energy manifested by this whirling motion and deliver the water to the next row of rotating blades. These blades, like the blades through which the water has already passed, have flat working faces and are located at an angle to the working faces of the vanes 17 so that they again impart a whirling motion to the water and at the same time project it axially with relation to the stator. The dissipation or absorption of the energy imparted to the water is accomplished in each row of stationary vanes and consequently the water in traversing the axial passage between the rotor and stator alternately receives and delivers energy. The water after having passed through the blades and vanes is received by one or the other of the passages 27 or 27ª, from which it flows through the apertures 28 and 28ª formed in the web portions 15 and 15ª of the rotor. The water, after having passed through the apertures 28 and 28ª, is again delivered to the blades and vanes so that it circulates in substantially an oval path in which the blades and vanes are arranged symmetrically.

The brake here illustrated is of the double flow type, that is, water may enter the nozzles 25 and 26 and pass between the respective rows of blades; and if desired, valves may be placed in the ports 25 and 26 or the conduits leading to said ports 25 and 26 may be valved.

In view of the peculiar arrangement of the blades and vanes, the brake may effectively operate in either direction, that is, the brake is what may be termed a reversible brake in that it will efficiently measure the energy when the driving element, such as the motor, is operating either forward or backward.

Having thus described my invention, what I claim is:

1. In a device of the character described, a rotor, a stator surrounding the rotor and having a limited rotary motion about a center of rotation concentric with the center of rotation of the rotor, alternate rows of moving blades and stationary vanes mounted on the rotor and stator respectively, the stator vanes having working faces in radial alinement with the axis of the member carrying it, and the blades having flat working faces turned at an angle to the working faces of the vanes.

2. In a device of the class described, the combination with a stator and a rotor, the stator being mounted for limited movement about the rotor, alternate rows of flat blades and vanes on the rotor and stator, said rotor having ports to permit water to pass between the blades and vanes and reëntrant nozzles to cause the water to repass said ports.

3. In a reversible water brake, a rotor having a water passage formed in the web portion therof, a stator surrounding the rotor provided with a water inlet port and forming an annular passage around the rotor which communicates with the inlet port and with the passage formed in the web portion of the rotor, alternate rows of rotating and stationary blades mounted on the rotor and stator respectively and located within the annular passage, each of said blades and vanes having similar working faces formed on each side thereof.

4. In a device of the character described, a rotor, a rotatable shaft on which said rotor is mounted, a stator rotatively mounted on the shaft and surrounding the rotor, and having an axially extending annular liquid delivery passage located between it and the peripheral face of the rotor, and a liquid inlet port formed therein and communicating with said passage, alternately arranged rows of radially extending substantially flat blades and vanes mounted on the rotor and stator respectively and located in said passage, and an axially extending liquid passage formed in the rotor and communicating with both ends of said annular passage.

5. In a reversible water brake having liquid delivery apertures through the web portion thereof, a stator surrounding the rotor and providing an axially extending annular passage around the periphery of the rotor which communicates at each end with the apertures in the rotor, alternate rows of stationary vanes and rotating blades mounted on said stator and rotor respectively and located in the axially extending passage, and a vapor receiving chamber within the stator and surrounded by the annular passage.

6. A reversible water brake comprising a bilaterally symmetrical rotor having liquid passages formed through the web portion thereof, a bilaterally symmetrical stator provided with a liquid inlet port and surrounding said rotor and forming an axially extending annular passage around the periphery of each half of the rotor, said passages communicating at each end with the passages formed in the web portions of the rotor, and with inlet ports formed in the stator, and alternately arranged rows of stationary and rotating blades located in each annular passage and mounted on the rotor and stator respectively, the opposed working faces of each of said blades being similar so that the rotor is capable of being driven in either direction.

In testimony whereof, I have hereunto subscribed my name this 30th day of September, 1910.

RAYMOND N. EHRHART.

Witnesses:
 C. W. McGhee,
 J. A. Griswold.